United States Patent
Sun et al.

(10) Patent No.: US 10,124,288 B2
(45) Date of Patent: Nov. 13, 2018

(54) CONTROLLING INJECTION OF MAGNESIUM OXIDE FOR CONTROLLING $SO_3$ WITH ENHANCED BOILER EFFICIENCY

(71) Applicant: FUEL TECH, INC., Warrenville, IL (US)

(72) Inventors: William H. Sun, Lisle, IL (US); Fabian Johan Solberg, Katy, TX (US); Gerry Carl Snow, Spokane, WA (US); Steven William Cottingham, Oak Park, IL (US); Vasudeo Shashikant Gavaskar, Chicago, IL (US)

(73) Assignee: FUEL TECH, INC., Warrenville, IL (US)

( * ) Notice: Subject to any disclaimer, the term of this patent is extended or adjusted under 35 U.S.C. 154(b) by 686 days.

(21) Appl. No.: 14/516,682

(22) Filed: Oct. 17, 2014

(65) Prior Publication Data
US 2015/0107498 A1    Apr. 23, 2015

Related U.S. Application Data

(60) Provisional application No. 61/892,495, filed on Oct. 18, 2013.

(51) Int. Cl.
*B01D 53/34* (2006.01)
*B01D 53/50* (2006.01)
(Continued)

(52) U.S. Cl.
CPC ......... *B01D 53/346* (2013.01); *B01D 53/508* (2013.01); *F23J 7/00* (2013.01);
(Continued)

(58) Field of Classification Search
CPC ... C10L 11/10; F23J 15/003; F23J 7/00; F23J 15/00; B01D 53/00; B01D 53/46;
(Continued)

(56) References Cited

U.S. PATENT DOCUMENTS

3,837,820 A * 9/1974 Kukin .................... C10L 1/1233
110/343
4,651,653 A * 3/1987 Anderson .................. F23J 7/00
110/234
(Continued)

*Primary Examiner* — David J Laux
(74) *Attorney, Agent, or Firm* — Thaddius J. Carvis (57) ABSTRACT

Disclosed is a process for controlling injection of magnesium oxide (or precursor) for reducing the concentration of sulfur trioxide in combustion gases from a combustor burning vanadium and sulfur-containing fuel while operating the boiler with enhanced efficiency. In-fuel introduction is combined with mid-temperature introduction, where both can be operated effectively, are found to be of primary importance. When in-fuel introduction will not be effective due to selectivity problems, feed can be shifted to a high-temperature zone. Where the high- or mid-temperature zone cannot be fully utilized due to obstructions for injection or insufficient soot blowers to address fouling of that zone or boiler operational changes to integrate the magnesium oxide injection is insufficient, an entire or a portion of feed can be shifted to the low-temperature zones.

3 Claims, 10 Drawing Sheets

(51) Int. Cl.
*F23J 7/00* (2006.01)
*F23J 15/00* (2006.01)

(52) U.S. Cl.
CPC ....... *F23J 15/003* (2013.01); *B01D 2251/402* (2013.01); *B01D 2251/602* (2013.01); *B01D 2258/0283* (2013.01); *F23J 2215/20* (2013.01)

(58) Field of Classification Search
CPC ...... B01D 53/50; B01D 53/60; B01D 53/346; B01D 53/507; B01D 53/501; B01D 53/502; B01D 53/504; B01D 2251/40; B01D 2251/402; B01D 2258/0183
USPC .................. 110/343, 185, 342, 344, 345, 348
See application file for complete search history.

(56) References Cited

U.S. PATENT DOCUMENTS

| | | | | |
|---|---|---|---|---|
| 4,793,268 A | * | 12/1988 | Kukin | F23J 7/00 |
| | | | | 110/343 |
| 5,122,353 A | * | 6/1992 | Valentine | B01D 53/508 |
| | | | | 110/343 |
| 7,383,790 B2 | * | 6/2008 | Francino | F22B 1/1846 |
| | | | | 122/379 |
| 2006/0257799 A1 | * | 11/2006 | Nowak | F23J 7/00 |
| | | | | 431/4 |

* cited by examiner

CONTROLLING INJECTION OF MAGNESIUM OXIDE FOR CONTROLLING SO₃ WITH ENHANCED BOILER EFFICIENCY

FIELD OF THE INVENTION

The invention relates generally to a process for controlling injection of magnesium oxide (or precursor) for reducing the concentration of sulfur trioxide in combustion gases from a combustor burning vanadium and sulfur-containing fuel while operating the boiler with enhanced efficiency.

BACKGROUND OF THE INVENTION

The technology of controlling sulfur trioxide in combustion effluents using magnesium oxide is well established but cannot always be employed without causing problems that may offset a projected advantage.

Sulfur trioxide ($SO_3$) is a byproduct of burning fuels that contain sulfur, which is oxidized during combustion. It primarily forms sulfur dioxide ($SO_2$). A portion of the sulfur dioxide is quickly oxidized to $SO_3$ by homogeneous and heterogeneous reactions. As the combustion gases work their way through the combustor, associated equipment and ductwork, more of the $SO_3$ is formed and can cause corrosion and plume.

$SO_3$ vapor readily converts to gaseous sulfuric acid when combined with water vapor in the combustion gases. As gas and surface temperatures cool through the combustor system, the $SO_3$ vapors form a fine aerosol mist of sulfuric acid. The acid aerosol contains sub-micron particles of acid, which can evade separation or capture in gas cleaning devices and exit the stack. Even relatively low $SO_3$ concentrations exiting the stack cause significant light scattering and can easily create a visible plume giving a high-opacity reading. As a general rule, every 1 part per million by volume of $SO_3$ will contribute from 1 to 3% opacity. Thus, exhaust gas concentrations of only 10 to 20 ppm $SO_3$ can cause opacity and acid plume problems. In addition, deposition or formation of acid on any metal surfaces below the acid dew point causes corrosion within the unit, commonly referred as cold-end corrosion that affects all equipment along the flue gas path such as the air heater, duct work and stack liners.

Burning heavy liquid fuels that contain vanadium as well as sulfur can make plume and acid corrosion particularly difficult to control. Slagging, plume and corrosion problems can be particularly acute for fuel oils produced from Venezuelan, Saudi Arabian, and Mexican crude and Canadian tar sands. These fuels, as well as No. 6 oil and others, will result in $SO_2$ generation and can cause many problems for boiler operators—including high-temperature slagging and fouling and related eutectic corrosion, cold-end corrosion and fouling, and opacity issues related to particulates and acid mist. In the combustion zone, sulfur in the oil (e.g., 1-5%) forms $SO_2$, some of which is oxidized to $SO_3$, which can condense as sulfuric acid on the back end surfaces (where the temperature has typically been reduced to less than about 150° C.) and promote corrosion and acid plume. $SO_3$ can result from oxidation by SCR catalysts, which often contain vanadium, and other metals, as well as metals in the fuel. Vanadium oxides, in particular, have been found to accumulate in deposits on heat exchange and duct surfaces and cause oxidation of $SO_2$ to $SO_3$.

Vanadium is a metallic element that chemically combines with sodium and oxygen to produce very aggressive low melting point compounds implicated in accelerated deposit formation and high-temperature corrosion. Vanadium is oil-soluble, and vanadium content varies in fossil fuels such as crude oil, coal, oil shale, and tar sands. The vanadium problem can be particularly acute for fuel oils produced from Venezuelan, Saudi Arabian, and Mexican crude and Canadian tar sands. In crude oil, concentrations up to 1200 ppm have been reported. When such oil products are burned, the traces of vanadium may initiate corrosion in boilers and will attach to heat exchange surfaces and catalyze the oxidation of $SO_2$ to $SO_3$. Vanadium cannot presently be economically reduced or removed by the refinery, so the use of combustion and post-combustion treatment methods and chemical additives are essential for fuels high in vanadium. While improvements have been made, there is yet to be found a methodology that can meet varying fuel sources and varying combustor loads with desired combustor heat outputs and reliability.

For $SO_3$ control, injection of alkali material such as magnesium oxide (typically introduced as magnesium hydroxide) can be useful; but it can result in accumulation of solids along the furnace floor and duct walls. Solids accumulation may lead to an outage of a combustor or a process as well as inefficient reagent use and added expense of solids disposal. Another adverse effect of introducing magnesium oxide is that it tends to lighten the color of the heat exchange surfaces and thus making them reflective, causing reduction in their heat exchange efficiency. The combined effect on heat exchange efficiency and solids accumulation cannot be tolerated in some combustors.

Not all alkaline treatment agents will be useful. For example, lime cannot be practically used to eliminate the $SO_3$ because it reacts with $SO_2$ to form gypsum, which can create severe fouling problems. Gypsum forms a hard, non-friable deposit with very low solubility that is difficult to remove.

In systems that may include a $NO_x$ reduction operation, such as SNCR or SCR processes, $SO_3$ causes a problem by reacting with water vapor and ammonia present due to $NO_x$ reduction chemicals. The result can be reaction to form ammonium sulfate and ammonium bisulfate. Both of these ammonia salts can cause fouling and corrosion problems in the system. Ammonium bisulfate has a melting point under 300° F. and ammonium sulfate at just over 450° F., making both molten or tacky at typical air heater operating temperatures and making it possible for them to coat, foul and corrode the air heater. However, the introduction of magnesium oxide in advance of an SCR catalyst may not sufficiently address $SO_3$ created within the catalyst. And, waiting for $SO_3$ remediation until after the SCR unit can leave hot-end slagging and corrosion problems untreated and result in such high $SO_3$ concentrations at the cold end that residence times for treatment and chemical dosages will be far too costly. For many boilers, operators have been forced to let the problems occur and then shut the combustor down for cleaning—a clearly undesirable option.

There is a present need for a process to solve the slagging, corrosion and plume problems for burning sulfur-containing fuels, especially those having significant vanadium contents. And, there is a need to solve as much of these problems as practical without adversely affecting the efficiency of the combustor burning the problem fuels.

SUMMARY OF THE INVENTION

The present invention provides a process for remediating slagging, corrosion and plume problems associated with the burning sulfur-containing fuels, especially those having significant vanadium contents.

A process for controlling injection of magnesium oxide for reducing the concentration of sulfur trioxide in combustion gases from a combustor while maintaining heat exchange efficiency, comprising: (a) where effective, feeding magnesium oxide or precursor with fuel fed to the combustor at an in-fuel feed rate effective to cause chemical composition of resulting slag to differ from what it would be without the magnesium oxide or precursor; (b) optionally, at the same time as in-fuel feeding or by itself, feeding magnesium oxide or precursor at a high-temperature feed rate to a combustor at one or more positions in a high-temperature zone having a temperature above 1800° F.; (c) feeding magnesium oxide or precursor at a mid-temperature feed rate to combustor at one or more positions in a mid-temperature zone having a temperature of from 1200° to below 1800° F.; (d) optionally feeding at the same time or by itself magnesium oxide or precursor at a low-temperature feed rate to a combustor at one or more positions in a low-temperature zone having a temperature below 1200° F.; (e) periodically determining boiler efficiency by monitoring at least one parameter indicative of boiler heat transfer to heat exchange fluid to provide an efficiency input signal indicative of that parameter, comparing the efficiency input signal to a reference value and generating an efficiency output signal indicative of boiler efficiency; (f) periodically determining $SO_3$ concentration in the boiler effluent by monitoring at least one parameter indicative of effluent $SO_3$ to provide an $SO_3$ input signal indicative of that parameter, comparing the $SO_3$ input signal to a reference value and generating an $SO_3$ output signal indicative of effluent $SO_3$; (g) comparing the efficiency output signal and the $SO_3$ output signals to reference values to provide an adjustment signal, and varying the total amount of magnesium oxide fed at the in-fuel/in-combustor feed rate and the mid and low-temperature feed rate in response to adjustment signal; (h) repeating steps (a) through (g) a plurality of times; and (i) based on data obtained from repeating of steps (a) through (h), determining a corrected in-fuel/in-combustor feed rate, a corrected mid and low-temperature feed rate and a total amount of magnesium oxide to be fed, which will provide the optimum results in terms of $SO_3$ control while maintaining boiler efficiency.

In an embodiment as above, based on the data obtained from repeating of steps (a) through (i), also determining a corrected high-temperature feed rate and/or a corrected low-temperature feed rate.

In an embodiment as above, further including the step of: determining whether in-fuel injection can be effectively performed to cause chemical composition of resulting slag to differ from what it would be without the magnesium oxide or precursor, and, if not, replacing feeding to the fuel at the in-fuel feed rate with feeding to the high-temperature zone at the high-temperature feed rate.

In an embodiment as above, further including the step of: determining the effectiveness of soot blowing in the high- and mid-temperature zones and, if not effective, increasing the high-temperature feed rate and/or the low-temperature feed rate.

In an embodiment as above, further including the step of: determining the boiler operational changes including soot blowing operations, flue gas recirculation, attemperation, furnace $O_2$ level and other steps to integrate the introduction of magnesium oxide to the boiler operations in order to enhance boiler efficiency or mitigate the effects from the magnesium oxide introduction to the boiler.

These and other features and advantages of the invention will be described below.

DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION OF THE INVENTION

Figure 1:
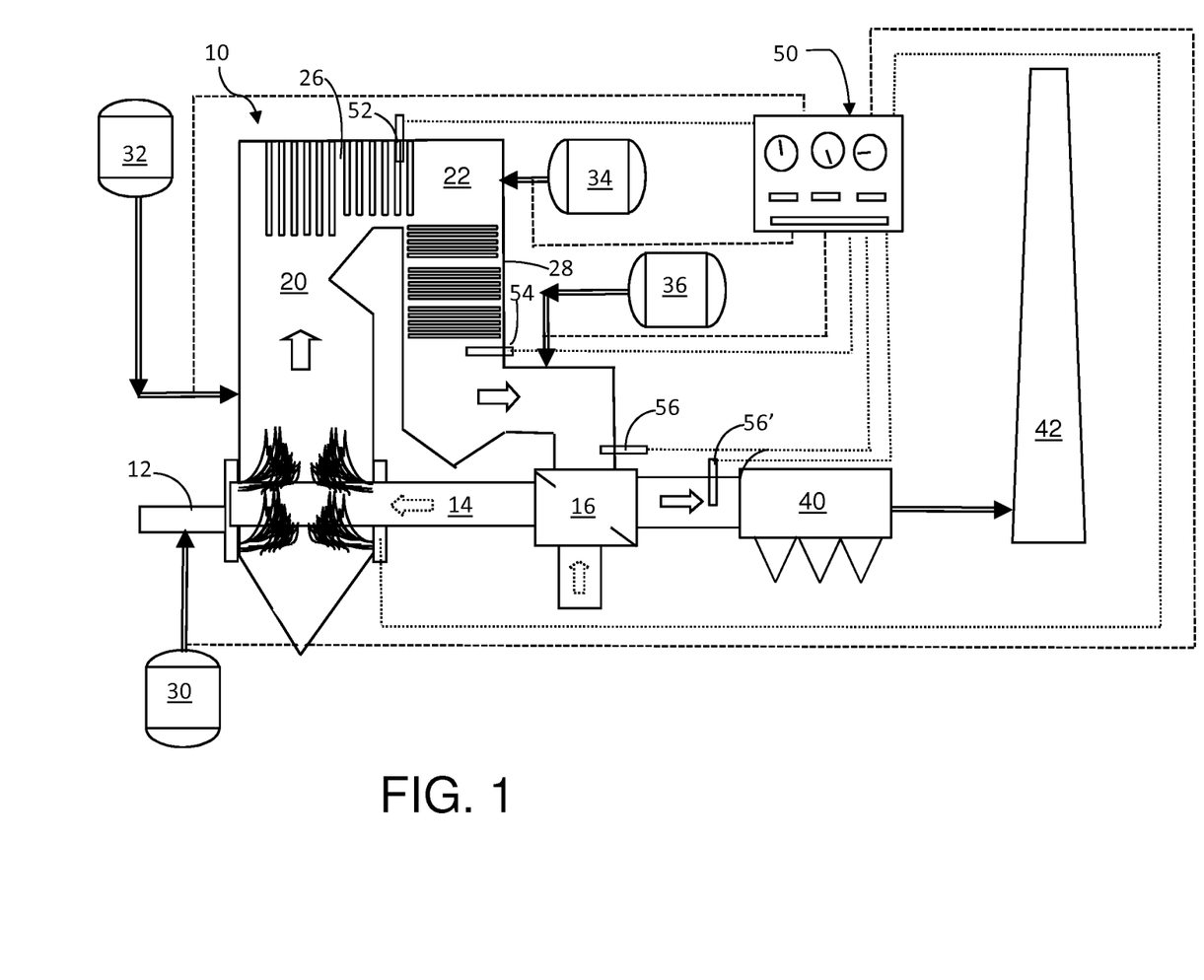
FIG. 1 is a schematic diagram of one simplified embodiment of the invention.

In describing the present invention, reference is made to the drawings, wherein there is seen is a schematic diagram of one simplified embodiment of the invention in FIG. 1 and several logic flow diagrams of different embodiments of the invention are shown in FIG. 2 through FIG. 9. The drawings and the steps of the processes they represent will be described briefly below, without undue recitation of sensors, pumps, indicators, transmitters, valves, pumps, and the like which are so well known to those skilled in engineering systems of this type.

The present invention provides a process for remediating slagging, corrosion and plume problems associated with the burning sulfur-containing fuels, especially those having significant vanadium contents, and we describe herein embodiments that employ controlled introduction of magnesium oxide or its precursor, e.g., magnesium hydroxide, to control $SO_3$ without adversely impacting combustor efficiency, and in some cases even improving the efficiency.

The term "vanadium-containing fuel" is meant to include fossil fuels and blends of one or more fossil fuels with one or more renewable fuels. Prominent among the fossil fuels that are vanadium containing are crude oil, heavy fuel oil, coal, oil shale, tar sands and the like. In crude oil, concentrations of vanadium of up to about 1200 ppm have been reported. Concentrations for a fuel or fuel blend of over 30 ppm will be considered moderate to high for definitional purposes herein. Vanadium contents of over 100 ppm will be defined as very high in vanadium. Many troublesome fuels will contain from 100 to 500 ppm of vanadium. When such vanadium-containing fuels are burned, the residue of vanadium will attach to heat exchange surfaces causing high-temperature corrosion and, if untreated, also catalyze the oxidation of $SO_2$ to $SO_3$, resulting in cold-end corrosion.

The term "sulfur-containing fuel" is meant to include fossil fuels and blends of one or more fossil fuels with one or more renewable fuels. Prominent among the fossil fuels that are vanadium containing are crude oil, heavy fuel oil, coal, oil shale, tar sands and the like. In crude oil, concentrations of sulfur of up to about 500 ppm have been termed low sulfur and coals with less than 1 percent have been similarly termed. For the purposes of the invention, sulfur concentrations for a fuel or fuel blend of over 500 ppm will be considered moderate to high for definitional purposes herein. Sulfur contents of over 1000 ppm will be defined as very high in sulfur. When such sulfur-containing fuels are burned, the resulting $SO_2$ to $SO_3$ concentrations provide major challenges, especially in fuels that also have moderate to high, and especially those with very high vanadium contents.

The term "magnesium oxide" is meant to include commercial forms of it and reagents that are equivalent to magnesium oxide, e.g., a precursor like magnesium hydroxide or organic magnesium. Materials can be equivalent in the sense that they provide magnesium oxide in a combustor and associated equipment, flue gas path, and duct work. The magnesium oxide is generally provided in the form of a slurry of magnesium hydroxide, or its precursor or other equivalent form. It is introduced in concentrations and amounts sufficient to passivate vanadium on heat exchange surfaces and react with $SO_3$ but not so great as to significantly lower the heat transfer effectiveness of the heat exchangers. The magnesium hydroxide reagent can be prepared from brines containing calcium and other salts, usually from underground brine pools or seawater. Dolomitic lime is mixed with these brines to form calcium chloride solution and magnesium hydroxide which is precipitated and filtered out of the solution. This form of magnesium hydroxide can be mixed with water, with or without stabilizers, to concentrations suitable for storage and handling, e.g., from 25 to 65% solids by weight. For use in the process, it is diluted as determined by computational fluid dynamics (CFD) to within the range of from 0.1 to 10%, more narrowly from 1 to 5%. Other forms of MgO can also be employed where necessary or desired, e.g., "light burn" or "caustic" can be as can other suitable chemicals can be substituted, e.g., in part, for the magnesium oxide/hydroxide described in detail above.

Without the invention, the passivation of vanadium on the heat exchange surfaces and the reaction with $SO_3$ can be competitive against the efficiency of the heat transfer to the point that operators even after adjusting boiler operations to minimize this effect and utilizing soot blowers to restore the efficiency, are often forced to let the problems occur and then shut the combustor down for cleaning—a clearly undesirable option. Boiler designs typically include many soot blowers, but the number and placement are often inadequate when burning high-vanadium and high-sulfur fuel. Generically, the magnesium oxide or precursor or alternate should be capable of spraying in fine droplet form, drying and dehydrating in case of magnesium hydroxide to an active powder within the available duct work and reacting with the $SO_3$ in the effluent. Among the suitable alternative chemicals are oxides or hydroxides of calcium, potassium, sodium, and/or other alkali and alkali earth metals when they can be used without creating slagging and/or encrustation on their own.

With reference to FIG. 1, there is seen is a schematic diagram of one simplified embodiment of the invention wherein a combustor 10 is depicted with fuel being supplied by line 12 and combustion air via line 14 from an air heater 16, which are burned to produce combustion gases that flow through the combustor and associated equipment and duct work in the direction of the solid-line block arrows to some sort of particulate recovery means 40 and final discharge to the atmosphere via stack 42.

Soot blowers (not shown) are preferably located as liberally as possible based on economics and availability of space to maintain heat exchange surfaces as clean as possible. A soot blower is a system for removing the soot that is deposited on the furnace tubes of a boiler during combustion. There are several types of soot blowers, including wall blowers, long retractable soot blowers (LRSB), and air heater blowers. They should be placed at any location where deposits may form and adversely impact heat transfer both convective and radiant, but often in older combustors and those designed for cleaner fuels there is a shortage of them and a shortage of space to include new ones. They can be operated automatically at predetermined time intervals or suitable control parameters such as heat exchanger efficiency, which can be determined in a number of ways, such as the demand for attemperation fluid or simply the feed or temperature of steam. The blowing medium can be steam or air. Steam is normally used as a medium for blowing away the soot since capital cost of steam pressure reducing equipment and drain is less than the cost of compressors, motors and control of air systems.

The hot combustion gases flow through several sets of heat exchangers, shown generally as heat exchanger banks 26 and 28, which tend to collect deposits as slag or other fouling and can be subject to hot-end corrosion. It is desired to include soot blowers as needed to control deposits on the heat exchangers; however, that is not always possible.

Magnesium oxide (or precursor) is introduced at two or more zones within the combustor 10 by means of injector means 30, 32, 34, and 36, which are shown as including a supply vessel and an injection means illustrated by an arrow. By introducing magnesium oxide at least with the fuel or high-temperature zone and at a mid-temperature zone having a temperature optimum for $SO_3$ conversion, can provide more effective results in terms of $SO_3$ control while maintaining boiler efficiency than previously observed. In-fuel injection is preferred to high-temperature in-furnace injection, but it is quite possible that high-temperature injection and mid-range may become the optimum due to non-selectiveness of in-fuel treatment. It is also possible that mid-range injection is not possible due to lack of open space for injection and poor mixing, thus requiring injection into an even lower temperature zone.

The amount of magnesium oxide or precursor added to the fuel by feeder 30 alone or also into the combustor by injector 32 will be sufficient to cause the chemical composition of resulting slag to differ from what it would be without the magnesium oxide or precursor. Typically, slag formed from high vanadium content fuels will contain large amounts of low-melting vanadium oxide compounds that catalyze conversion of $SO_2$ to $SO_3$. The addition of magnesium oxide to the fuel and/or to combustor will result in significant passivation of the vanadium in the slag, but cannot be added to the fuel and/or the combustor in amounts necessary to effectively treat downstream $SO_3$ without reducing heat transfer in heat exchanges such as illustrated at 26 and 28. The decrease in heat transfer efficiency seen by adding magnesium oxide in the fuel and/or to the combustor can result from one or both of (1) increased solids forming on the heat exchange surfaces and (2) lightening of the color of the slag so that it becomes more reflective, thereby reducing radiant heat absorption.

The amount of magnesium oxide or precursor to be used in the fuel at an in-fuel feed rate and optionally injected at a high-temperature feed rate to a combustor at one or more positions having a temperature above 1800° F. will be determined initially based on at least two considerations. First, the main purpose of the magnesium oxide or precursor at this stage is to cause the chemical composition of resulting slag to differ from what it would be without the magnesium oxide or precursor. The production of oxides of various compositions have been identified as possible catalysts for oxidation of $SO_2$ to $SO_3$, and the addition of magnesium oxide and precursors have been identified as having the ability to passivate the catalytic activity of these compositions to a significant extent. The in-furnace locations can be altered from their initially selected locations where correction is determined to be desirable, such as to locate a specific temperature zone or to adjust the distribution of chemical into the combustor to avoid certain areas that may foul easily or be more difficult to clean with soot blowers.

The use of magnesium oxide and precursors have also been used to reduce $SO_3$ concentrations once formed. However, based on many tests, the amount of magnesium oxide or precursor added with the fuel or injected into the combustor cannot be employed to both inhibit the initial catalytic activity of the vanadium compositions and to address reduction of $SO_3$ formed by other mechanisms especially on fuels containing high vanadium and high sulfur. When this has been attempted, the result is ineffective treatment at great cost and/or a loss of heat transfer efficiency due to heavier slag build up on heat transfer surfaces or an optical lightening of the slag with an accompanying reduction in radiant heat transfer.

Likewise, if it is attempted to add the magnesium oxide or precursor all downstream of the fuel or in-furnace, the solids loading can become so high that chemical introduction cannot be sufficient to adequately control low temperature corrosion, and $SO_3$. Furthermore, high temperature corrosion in the combustion will not be prevented. According to our invention, some portion of the magnesium oxide or precursor must be added with the fuel and/or injected into the combustor to assure passivation of vanadium catalytic activity and some portion must be added downstream to control $SO_3$ that does form.

We have determined that for fuels high in both sulfur and vanadium, the amount of magnesium oxide or precursor added to the fuel and/or injected into the combustor must be moderated to a reasonable level based on the vanadium content of the fuel. In some embodiments, the molar ratio ($R_{MMg/V}$) of magnesium added to the fuel/combustor to vanadium in the fuel will be from about 0.5 to about 25.0, with more typical doses having a molar ratio within the range of from about 1 to 10. Due to the low vanadium oxide concentration in the flue gas, an excess molar ratio is typically utilized to passivate the vanadium introduced from the fuel. Where biofuels based on cellulosic materials are added, the ratios may tend to the lower numbers, say 0.5 to 10, because these fuels themselves can lighten the slag coating on heat exchange surfaces. Converting these ratios for estimations of initial magnesium contents for in-fuel addition as magnesium hydroxide can be made using a factor of 2 times the vanadium content. The optimum ratio of amounts between the fuel and the combustor is unit specific and depend on many factors such as heat input, furnace geometry, boiler heat and mass balance, reagent distribution potential, burner zone heat release rate (BZHR), etc. Desirably, the in-fuel feed rate and the high-temperature feed rate will be balanced between them to give the best results in terms of vanadium passivation and heat exchanger efficiency.

The total addition of magnesium oxide or precursor to the combustor will depend on the sulfur content of the fuel as well as the vanadium content and other factors, some unique to an individual combustor. In general, the molar ratio of total added magnesium to sulfur in the fuel ($R_{MMg/S}$) can be from about 0.5 to 5.0. In some cases, solids loading may limit the amount employed. In others, economics will provide a limit. The total feed of magnesium oxide or precursor to the combustor will also be controlled and adjusted as seen necessary. The flow charts in FIG. 2 through FIG. 9, provide a number of control configurations.

Magnesium hydroxide can be mixed with water to form a slurry, which is then mixed with the fuel just before use or organic magnesium can be mixed with the fuel directly before use. It is sometimes useful to employ a catalyst in the fuel also. The particle size of the magnesium hydroxide in the slurry can be controlled as necessary for emulsion stability and distribution in the combustor 10. Magnesium hydroxide slurries composed of fine particles, say having a mean diameter of under 8 microns, e.g., under 5 microns, say from about 3 to 4.5 microns, are effective in the fuel and downstream. If necessary, stabilizers can be employed for mixing to concentrations suitable for storage and handling, e.g., from 25 to 65% solids by weight. For use in the process, the emulsion can be diluted as determined by emulsion stability to within the range of from 2 to 50%, more narrowly from 10 to 30%.

The addition of magnesium hydroxide to the fuel and/or injected into the combustor is essential to the invention to control the catalytic activity of vanadium in slag for converting $SO_2$ to $SO_3$, and it is also necessary that the amount of magnesium oxide added be limited so as not to decrease heat transfer efficiency. To ensure that sufficient magnesium oxide or precursor is added to effectively treat $SO_3$, the magnesium oxide or precursor is introduced into at least one other zone in the combustor, with the requirement that at least some of it be introduced within a zone where the temperature is within the range of from about 1200° F. to under 1800° F. This is a mid-temperature range where the reaction rate of the magnesium oxide with the $SO_3$ is relatively high and where the residence time is sufficient. Thus, at least a portion of the total magnesium oxide will be added at a mid-temperature zone by suitable means illustrated as injector means 34, which will preferably be designed to provide coverage across the entire cross section of the ducting at the place of introduction as reasonably possible considering obstructions and steam pipes along the flue gas path. The invention can employ any type of air heaters 16 including Ljungstrom airheaters, tubular airheaters, and the like.

Figure 2:
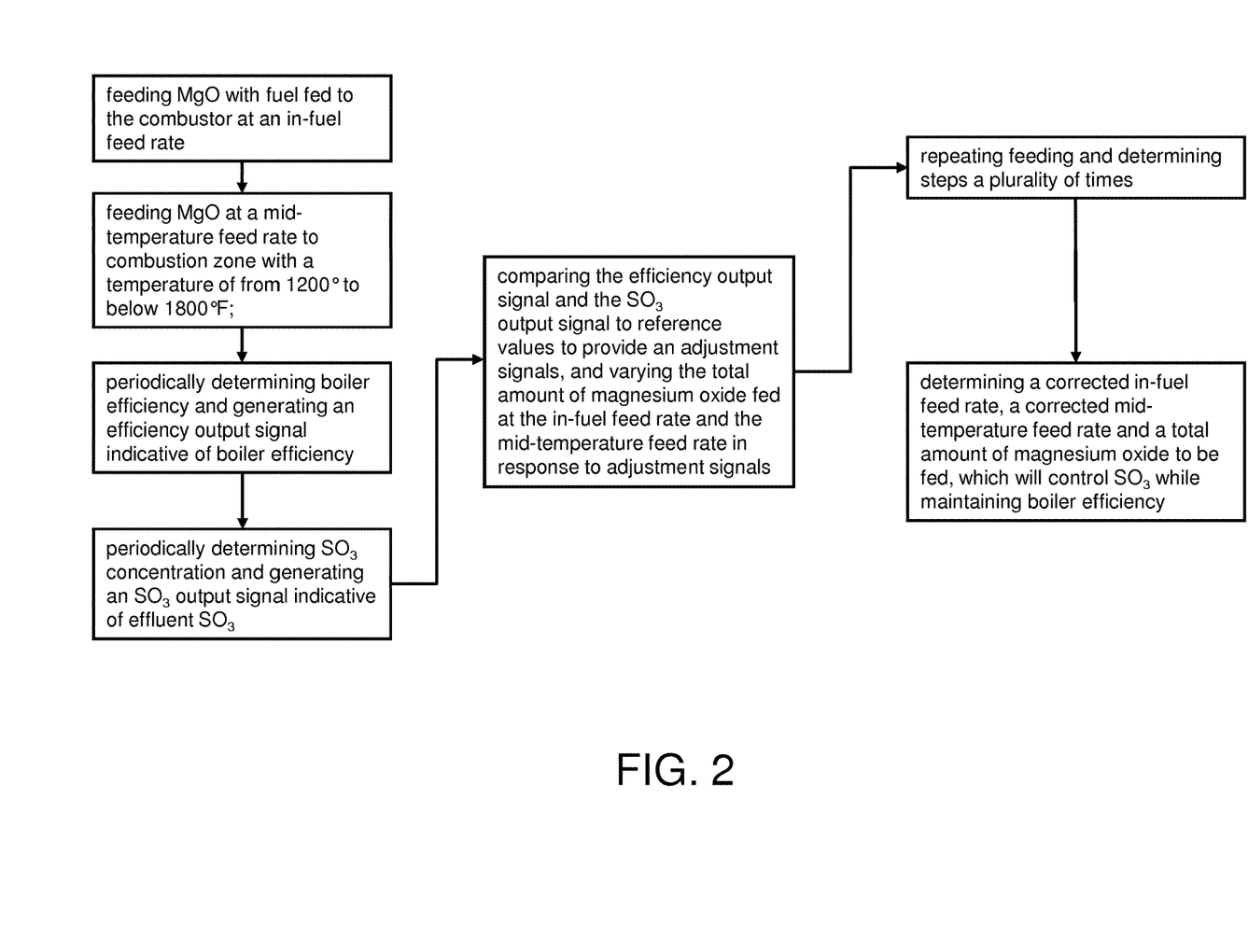
FIG. 2 is a logic flow diagram of a simplified embodiment of the invention.
Figure 3:
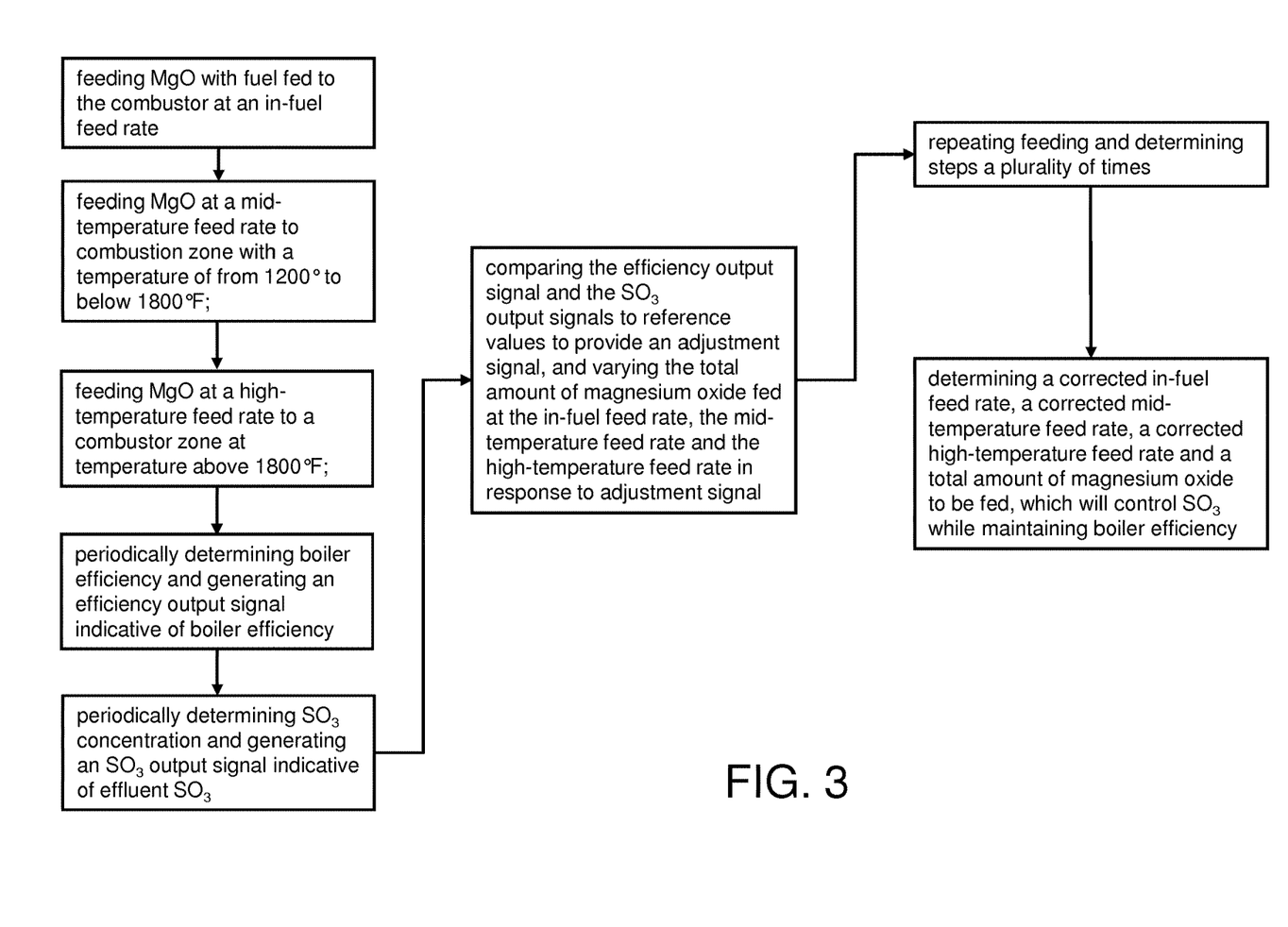
FIG. 3 is a logic flow diagram of another simplified embodiment of the invention.
Figure 4:
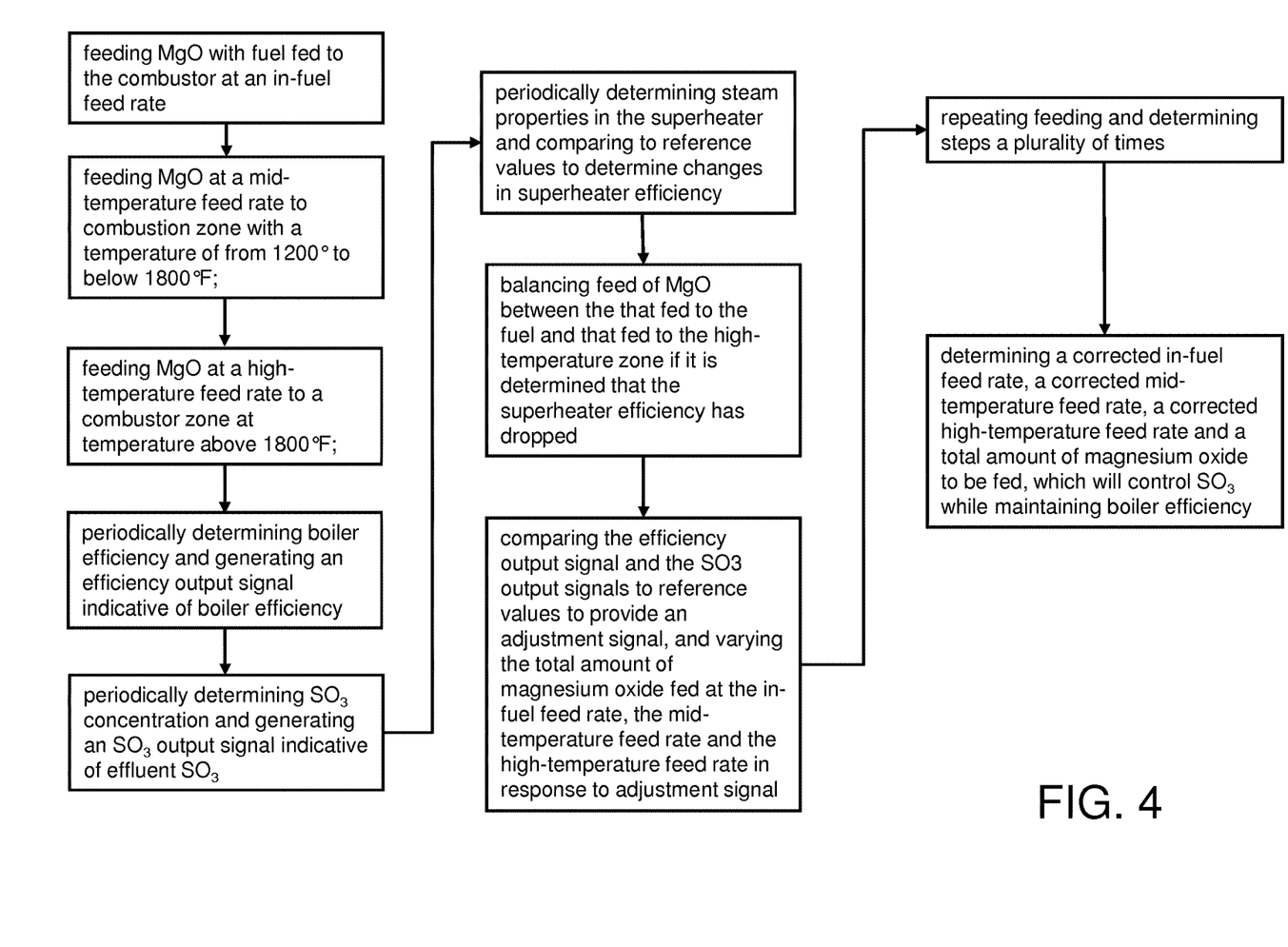
FIG. 4 is a logic flow diagram of another simplified embodiment of the invention.

It has also been found according to the invention that it is essential that a significant portion of total magnesium oxide or precursor be added following the hottest sections of the combustor but at a location where there is still enough residence time and high enough temperature for reaction with the $SO_3$, typically prior to an air heater. Accordingly, the invention calls for feeding magnesium oxide or precursor at a mid-temperature feed rate to combustor at one or more positions in a zone having a temperature of from 1200° to below 1800° F. FIG. 2 is a logic flow diagram of a simplified embodiment of the invention in which the magnesium oxide or precursor is added to the fuel and to a mid-temperature zone.

In this aspect of the invention, the process for controlling injection of magnesium oxide or precursor for reducing the concentration of sulfur trioxide in combustion gases from a combustor while maintaining heat exchange efficiency, comprises feeding magnesium oxide or precursor to the fuel at an in-fuel feed rate and/or, if necessary, in the high temperature zone of the combustor at a high-temperature feed rate, combined, effective to cause chemical composition of resulting slag to differ from what it would be without the magnesium oxide or precursor, as well as feeding magnesium oxide or precursor to the fuel at an mid-temperature feed rate to one or more positions in the combustor 10 having a temperature of from 1200° to below 1800° F. where this is possible.

The introduction at both of the high-temperature and mid-temperature locations is controlled by periodically determining boiler efficiency by monitoring at least one parameter indicative of boiler heat transfer to heat exchange fluid to provide an efficiency input signal indicative of that parameter, comparing the efficiency input signal to a reference value and generating an efficiency output signal indicative of boiler efficiency. Sensors like 52 can measure parameters specific to individual heat exchangers at one or more locations to enable overall control as well as balancing the feed rates between zones. Note also sensor 54 in FIG. 1, which can measure gas temperature following heat exchangers 28. Also, periodically, the $SO_3$ concentration in the combustion gases is determined at one or more suitable locations in the boiler effluent by monitoring at least one parameter indicative of effluent $SO_3$ to provide an $SO_3$ input signal indicative of that parameter, comparing the $SO_3$ input signal to a reference value and generating an $SO_3$ output signal indicative of effluent $SO_3$. Note in this regard, sensors 56 and 56' in FIG. 1. Each of these indicated types of sensors will be strategically located at one or a plurality of locations to provide the most useful information possible at reasonable cost to assure proper operation in terms of boiler efficiency, $SO_3$ control and reagent utilization.

The step of comparing the efficiency output signal and the $SO_3$ output signals to reference values, such as by controller 50 shown in FIG. 1, provides an adjustment signal. Then, the total amount of magnesium oxide or precursor fed at the in-fuel feed rate and the mid-temperature feed rate are adjusted in response to adjustment signal. Then, each of the feeding and determining steps are repeated a number of times, e.g., on a regular schedule of timed intervals. Then, based on data obtained from repeating the noted steps, a corrected in-fuel feed rate, a corrected mid-temperature feed rate and a total amount of magnesium oxide to be fed, are calculated or otherwise determined. This can provide the optimum results in terms of $SO_3$ control while maintaining boiler efficiency.

In addition to these required zones of introduction, other optional zones can also be employed. In one embodiment, illustrated in FIG. 3, which is a logic flow diagram of another simplified embodiment of the invention, magnesium oxide or precursor optionally fed at a high-temperature feed rate to a combustor at one or more positions having a temperature above 1800° F., e.g., at a high-temperature zone by suitable means illustrated as injector means 32, which will preferably be designed to provide coverage across the entire cross section of the ducting at the place of introduction.

Figure 5:
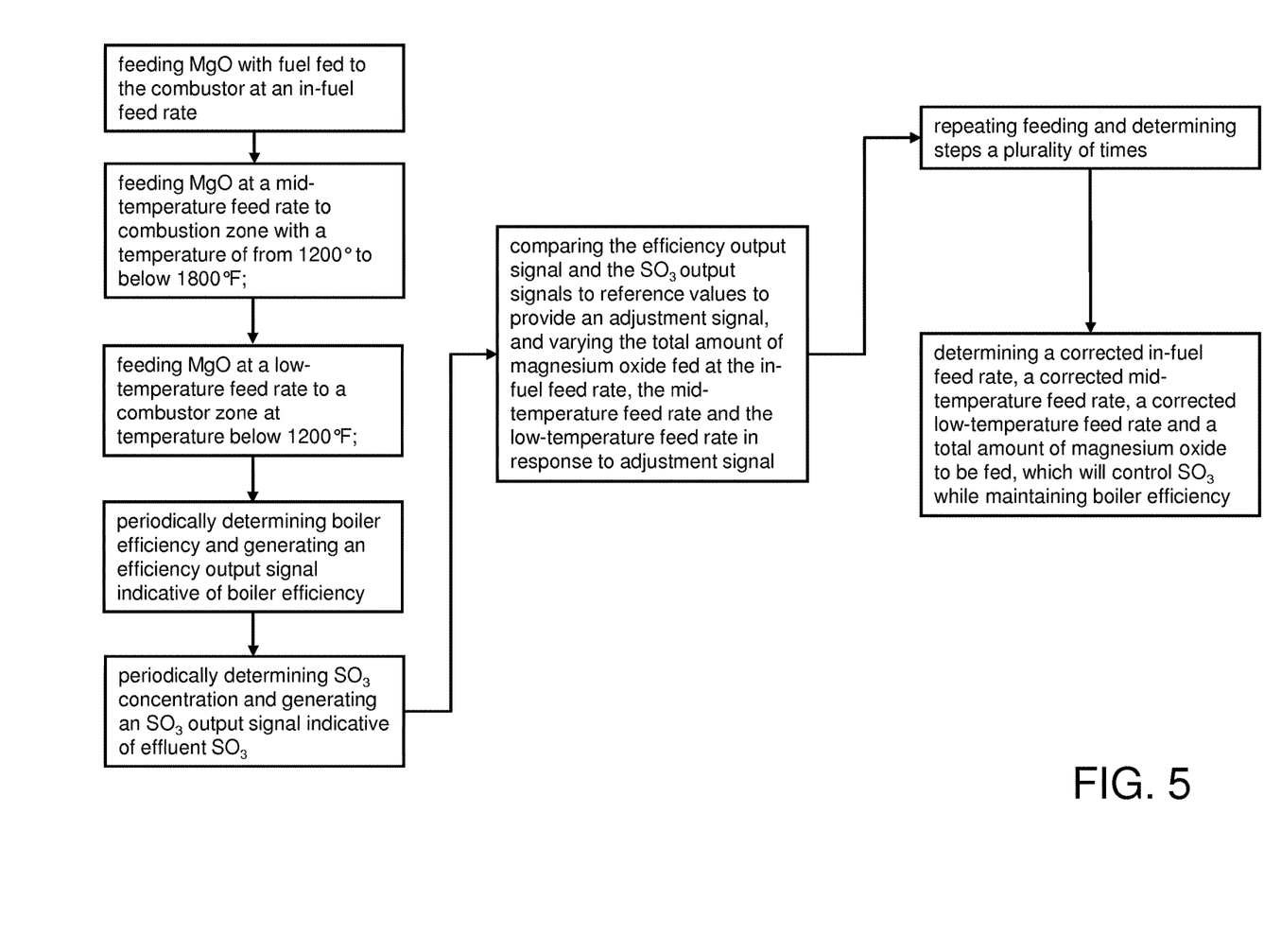
FIG. 5 is a logic flow diagram of another simplified embodiment of the invention.
Figure 6:
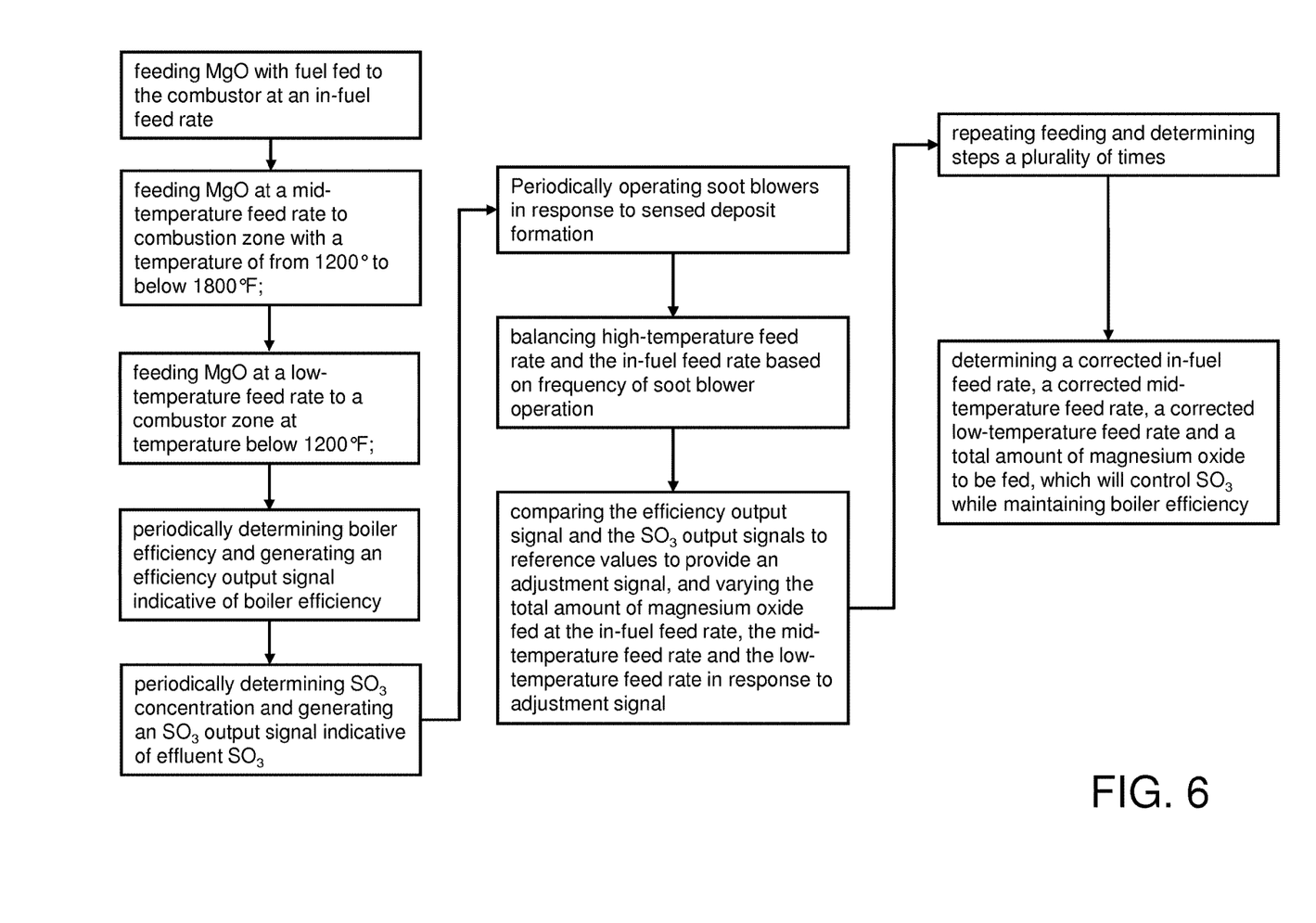
FIG. 6 is a logic flow diagram of another simplified embodiment of the invention.
Figure 6A:
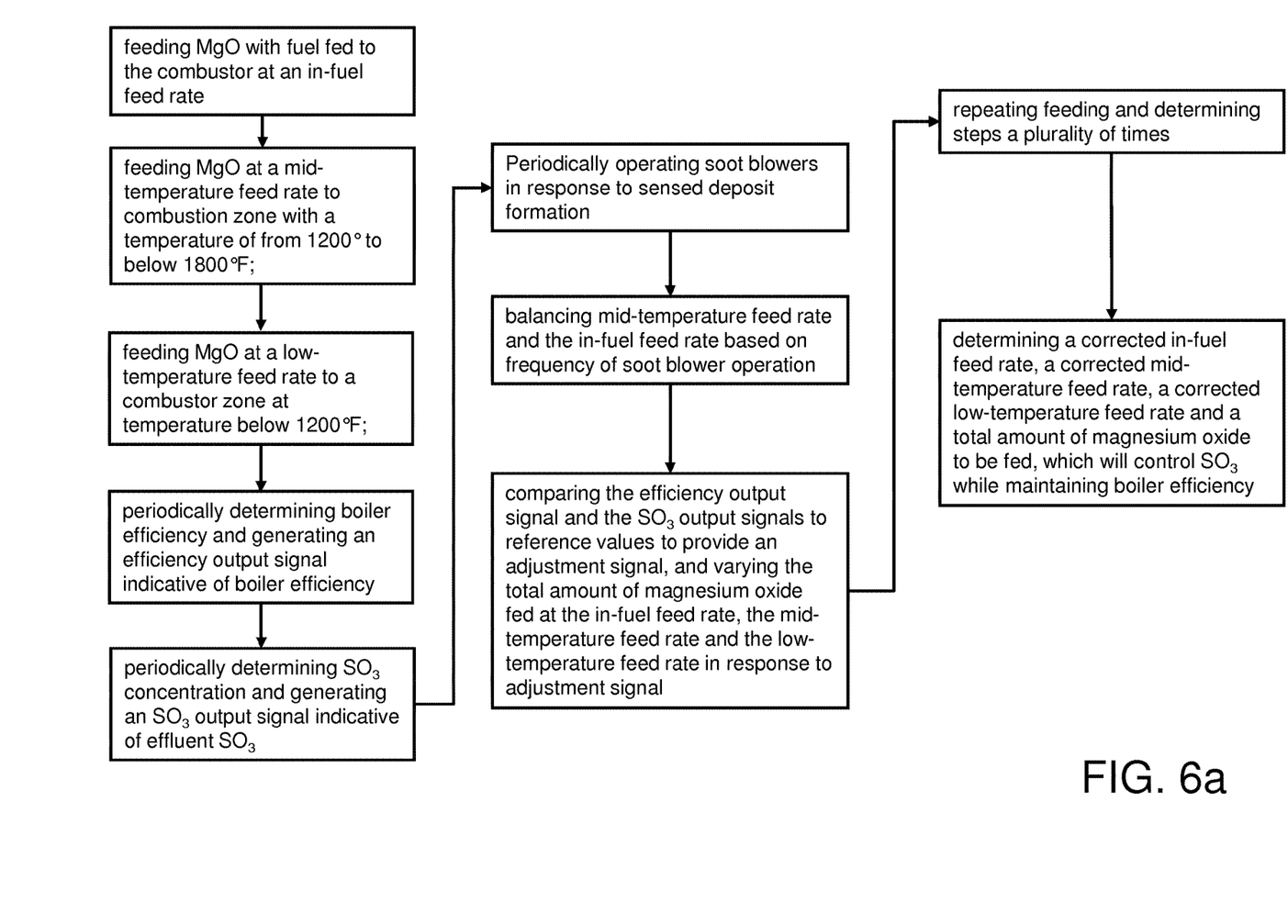
FIG. 6a is a logic flow diagram of another simplified embodiment of the invention.

In addition to these above points of introduction, another optional zone can be employed as in the embodiment illustrated in FIG. 5, which is a logic flow diagram of another simplified embodiment of the invention. In FIG. 5, magnesium oxide or precursor optionally fed at a low-temperature feed rate to a combustor at one or more positions having a temperature below 1200° F., e.g., at a low-temperature zone by suitable means illustrated as injector means 36, which will preferably be designed to provide coverage across the entire cross section of the ducting at the place of introduction. In this case, the controller will use the sensed values and signals determined relative to them to also calculate the amount of reagent fed to the high-temperature feed zone. The embodiment illustrated in FIG. 5, is varied in FIG. 6 and FIG. 6a.

Figure 7:
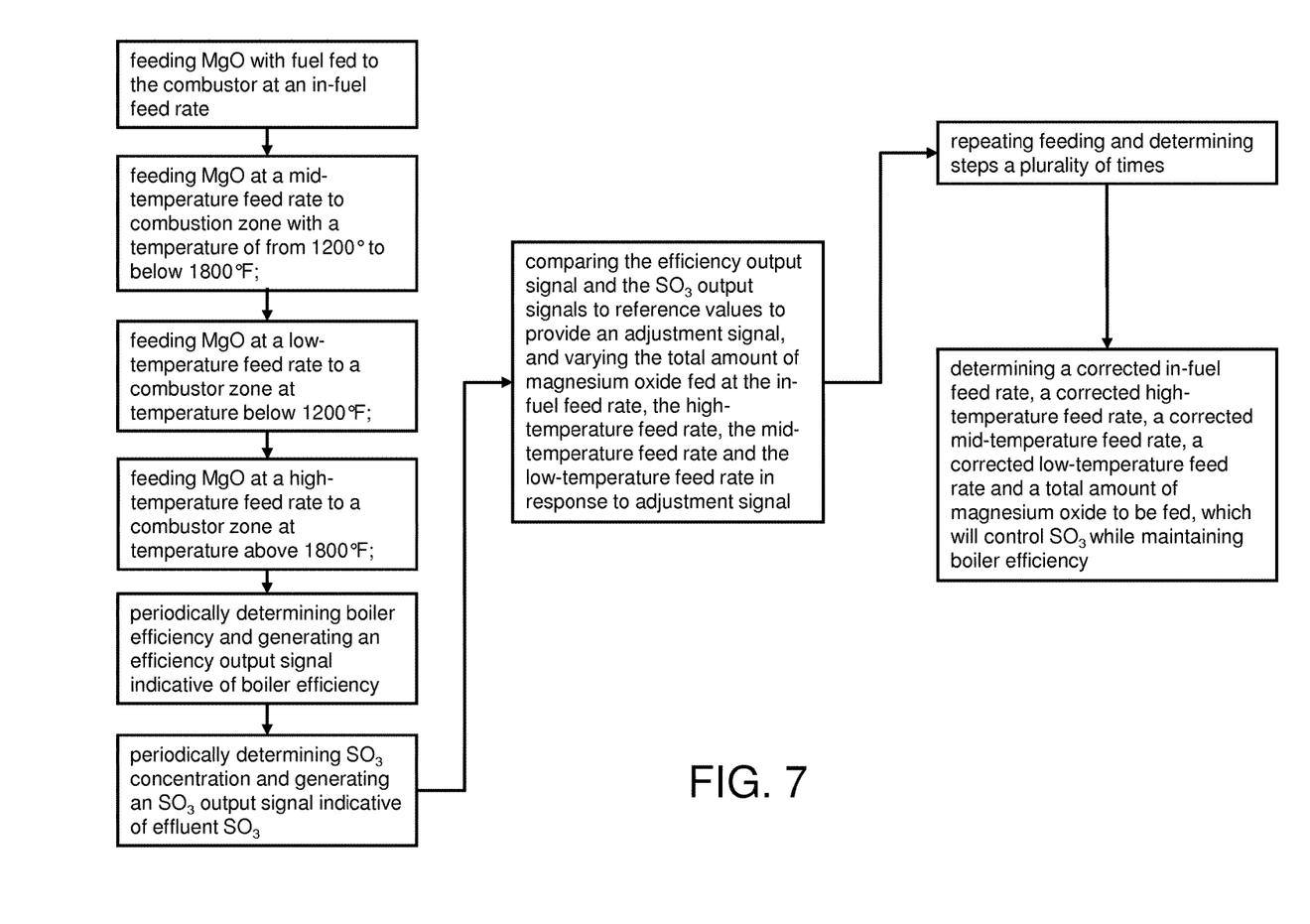
FIG. 7 is a logic flow diagram of another simplified embodiment of the invention.
Figure 8:
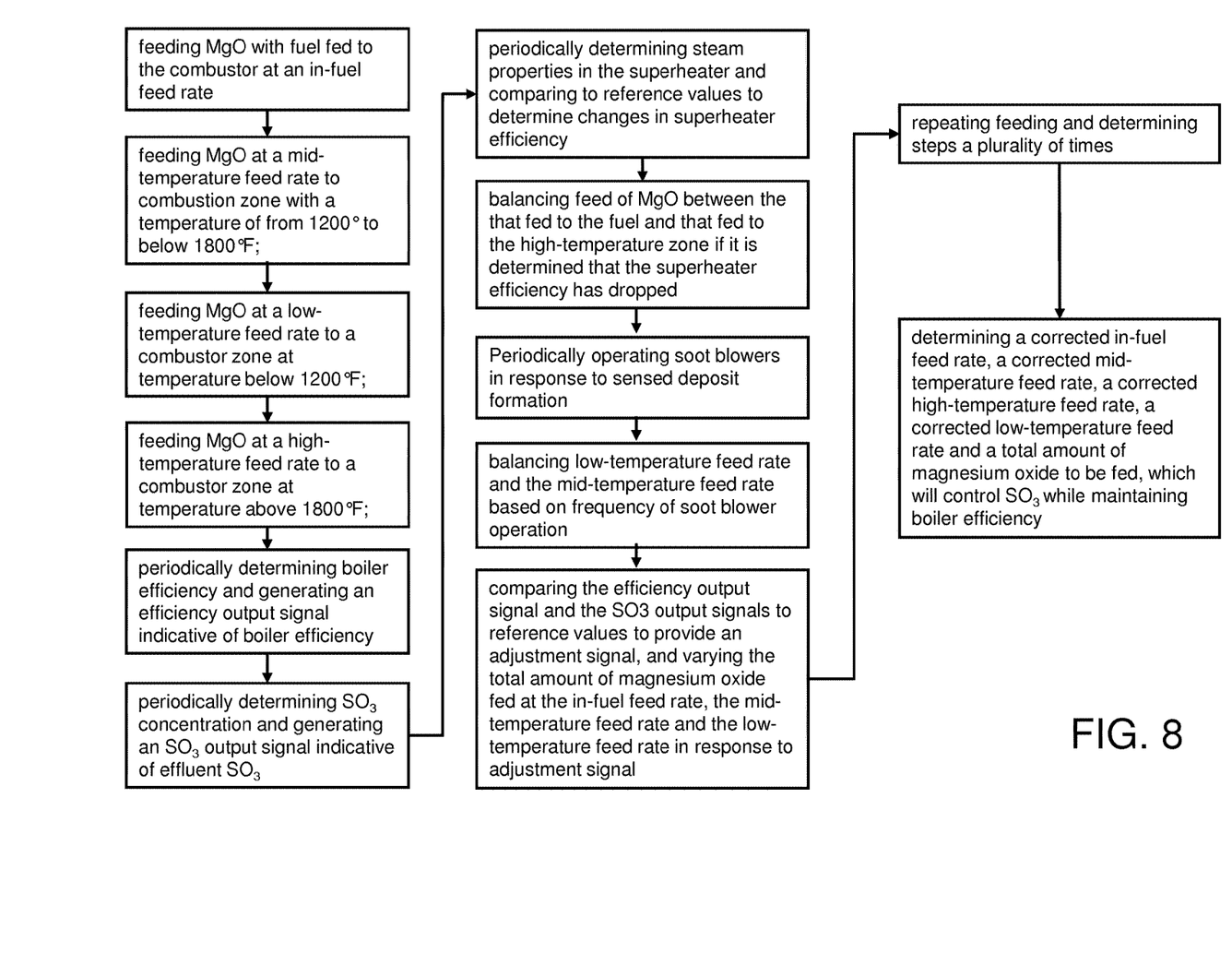
FIG. 8 is a logic flow diagram of another simplified embodiment of the invention.
Figure 9:
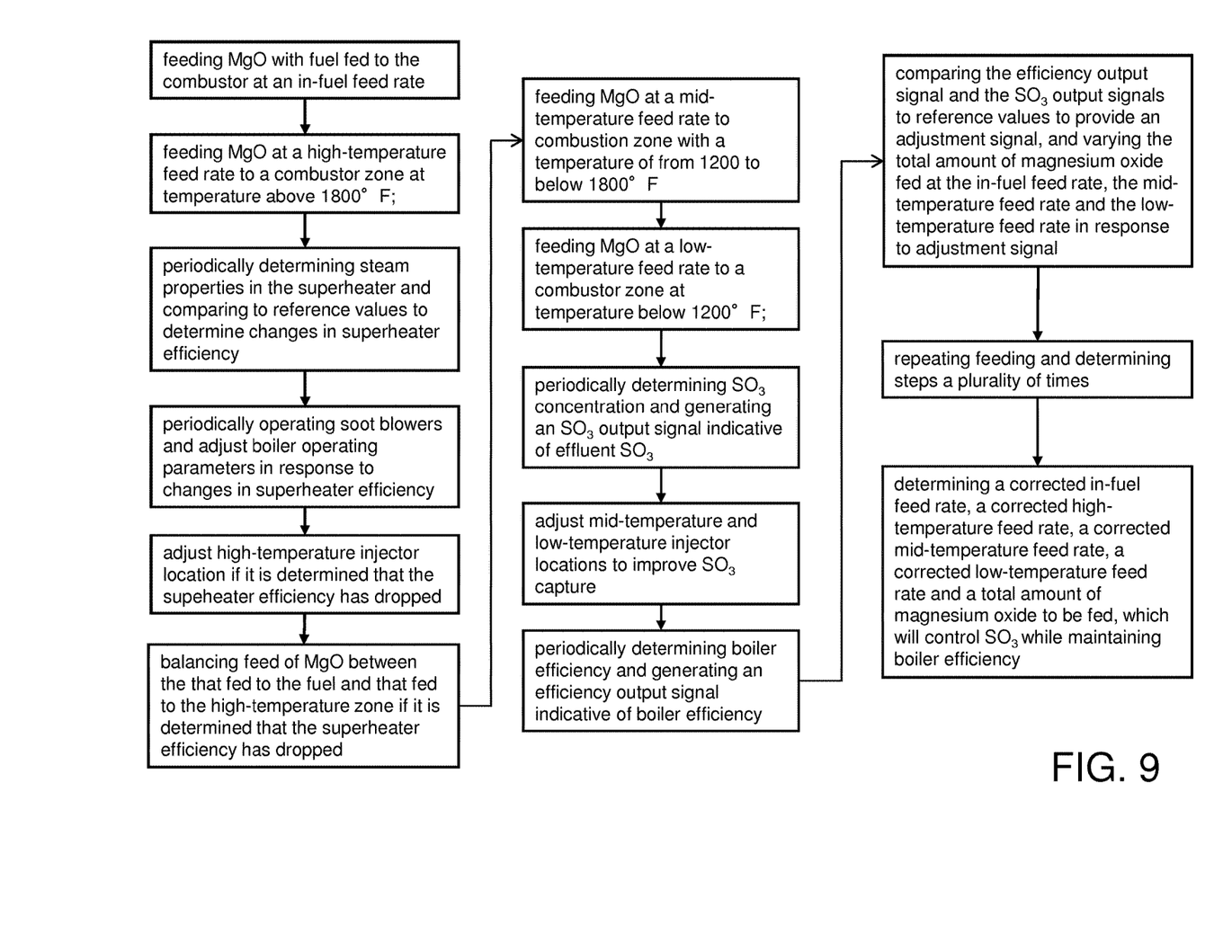
FIG. 9 is a logic flow diagram of another simplified embodiment of the invention.

In another embodiment, as in the embodiment illustrated in FIG. 7 magnesium oxide or precursor is fed at a low-temperature feed rate to a combustor at one or more positions having a temperature below 1200° F., e.g., at a low-temperature zone by suitable means illustrated as injector means 36, and at a high-temperature feed rate to a combustor at one or more positions having a temperature above 1800° F., to provide coverage across the entire cross section of the ducting at the place of introduction. In this case, the controller will use the sensed values and signals determined relative to them to also calculate the amount of reagent fed to the high-temperature feed zone and the low-temperature zones. The embodiment illustrated in FIG. 7, is varied in FIG. 8 and FIG. 9.

Target $SO_3$ concentrations will be dictated by corrosion problems in the combustor and visible plume caused by $SO_3$. Results in terms of heat exchange efficiency and $SO_3$ emission used to modify the process to achieve a desired balance for the process.

The above description is for the purpose of teaching the person of ordinary skill in the art how to practice the invention. It is not intended to detail all of those obvious modifications and variations, which will become apparent to the skilled worker upon reading the description. It is intended, however, that all such obvious modifications and variations be included within the scope of the invention, which is defined by the following claims. The claims are meant to cover the claimed components and steps in any sequence that is effective to meet the objectives there intended, unless the context specifically indicates the contrary.

What is claimed is:

1. A process for controlling injection of magnesium oxide for reducing the concentration of sulfur trioxide in combustion gases from a combustor burning a fuel having a sulfur content above 500 ppm and a vanadium content above 30 ppm while maintaining heat exchange efficiency, comprising:

a. feeding magnesium oxide or precursor with fuel fed to the combustor at an in-fuel feed rate effective to cause chemical composition of resulting slag to differ from what it would be without the magnesium oxide or precursor and determining the effectiveness of fuel fed magnesium oxide to cause the chemical composition of resulting slag to so differ;

and/or feeding magnesium oxide or precursor at a high-temperature feed rate to a combustor at one or more positions in a high-temperature zone having a combustion gas temperature above 1800° F.;
   and b. feeding magnesium oxide or precursor to provide coverage across the entire cross section of the ducting at the place of introduction at a mid-temperature feed rate to the combustor at one or more positions in a mid-temperature zone having a combustion gas temperature of from 1200° to below 1800° F.;

and feeding magnesium oxide or precursor at a low-temperature feed rate to a combustor at one or more positions in a low-temperature zone having a combustion gas temperature below 1200° F.;

c. periodically determining boiler efficiency by monitoring at least one parameter indicative of boiler heat transfer to heat exchange fluid to provide an efficiency input signal indicative of that parameter, comparing the efficiency input signal to a reference value and generating an efficiency output signal indicative of boiler efficiency;

d. periodically determining $SO_3$ concentration in the boiler effluent by monitoring at least one parameter indicative of effluent $SO_3$ to provide an $SO_3$ input signal indicative of that parameter, comparing the $SO_3$ input signal to a reference value and generating an $SO_3$ output signal indicative of effluent $SO_3$;

e. comparing the efficiency output signal and the $SO_3$ output signals to reference values to provide an adjustment signal, and varying the amounts of magnesium oxide fed in response to the adjustment signal;

f. repeating steps a through e a plurality of times; and g. based on data obtained from repeating of steps a through e, determining corrected feed rates by means of a controller, which will provide the optimum results in terms of $SO_3$ control while maintaining boiler efficiency.

2. The process for controlling injection of magnesium oxide according to claim 1, further including the step of:
determining the effectiveness of soot blowing in the high- and mid-temperature zone and, if not effective, modifying the high-temperature and mid-temperature feed rates and/or the low-temperature feed rate.

3. The process for controlling injection of magnesium oxide according to claim 1, further including the step of:
making changes to boiler operations including furnace oxygen level, fuel feed rate, superheater attemperation, feedwater temperature, steam coil, or airheater, to mitigate magnesium oxide injection effects and if not effective, re-distributing feed rates in favor of lower temperature zones.

* * * * *